United States Patent
Rabelo et al.

(10) Patent No.: US 10,872,113 B2
(45) Date of Patent: Dec. 22, 2020

(54) IMAGE RECOGNITION AND RETRIEVAL

(71) Applicant: Hewlett-Packard Development Company, L.P., Houston, TX (US)

(72) Inventors: Andre Rabelo, Sant Cugat del Valles (ES); Lucio Polese Cossio, Porto Alegre (BR); Renato Oliveira da Silva, Porto Alegre (BR); Edwin Csrlo Ribeiro Marinho, Recife (BR); Fernanda Vieira de Barros Almeida, Recife (BR); Fäbio Almeida Melo, Recife (BR); Victor Hazin da Rocha, Recife (BR); Deise Miranda Borges, Recife (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 155 days.

(21) Appl. No.: 16/097,509

(22) PCT Filed: Jul. 19, 2016

(86) PCT No.: PCT/US2016/042944
§ 371 (c)(1),
(2) Date: Oct. 29, 2018

(87) PCT Pub. No.: WO2018/017059
PCT Pub. Date: Jan. 25, 2018

(65) Prior Publication Data
US 2019/0146992 A1 May 16, 2019

(51) Int. Cl.
*G06F 16/00* (2019.01)
*G06F 16/583* (2019.01)
(Continued)

(52) U.S. Cl.
CPC ............ *G06F 16/583* (2019.01); *G06F 16/00* (2019.01); *G06F 16/215* (2019.01); *G06F 16/51* (2019.01);
(Continued)

(58) Field of Classification Search
CPC .... G06K 9/00744; G06K 9/46; G06K 9/4671; G06K 9/6255; G06K 9/626;
(Continued)

(56) References Cited

U.S. PATENT DOCUMENTS 7,120,195 B2 * 10/2006 Patti ...................... H04N 19/51
375/240.03
8,145,656 B2 * 3/2012 Shatz .................... G06F 16/634
707/758
(Continued)

OTHER PUBLICATIONS

Andre Araujo et al., Temporal Aggregation for Large-scale Query-by-image Video Retrieval, May 19, 2015: < http://web.stanford.edu/ ~ 5 pages.
(Continued)

*Primary Examiner* — Merilyn P Nguyen
(74) *Attorney, Agent, or Firm* — HP Inc. Patent Department

(57) ABSTRACT

Techniques are described herein for image recognition and retrieval. A system for image recognition and retrieval includes an imager to capture a plurality of image frames. The system also includes an image eliminator to discard any image frame of the plurality of image frames that does not meet a specified quality threshold. A remaining set of image frames is obtained. An image grouper groups the remaining set of image frames into groups of a specified number. A group of image frames is obtained. The system further includes a feature identifier to identify and describe features of the group of image frames. A requester sends a query to
(Continued)

a content-based image retrieval server. The query contains descriptors for the features of the group of image frames.

15 Claims, 15 Drawing Sheets

(51) Int. Cl.
*G06K 9/00* (2006.01)
*G06K 9/46* (2006.01)
*G06F 16/783* (2019.01)
*G06F 16/215* (2019.01)
*G06F 16/51* (2019.01)
*G06F 16/58* (2019.01)
*G06T 7/00* (2017.01)

(52) U.S. Cl.
CPC ........ *G06F 16/5866* (2019.01); *G06F 16/783* (2019.01); *G06K 9/00624* (2013.01); *G06K 9/00664* (2013.01); *G06K 9/46* (2013.01); *G06K 9/4604* (2013.01); *G06T 7/0002* (2013.01); *G06T 2207/30168* (2013.01)

(58) Field of Classification Search
CPC ........... G06K 9/00664; G06K 9/00624; G06K 9/00711; G06T 7/207; G06T 7/246; G06T 2207/10016; G06T 2207/30168; G06T 7/0002; G06T 7/73; G06F 16/00; G06F 16/215; G06F 16/51; G06F 16/583; G06F 16/5866; G06F 16/783; G06F 16/683
See application file for complete search history.

(56) References Cited

U.S. PATENT DOCUMENTS

| 9,818,451 | B1* | 11/2017 | Tyagi ..................... G11B 27/34 |
| 2002/0019819 | A1 | 2/2002 | Sekiguchi et al. |
| 2010/0017389 | A1 | 1/2010 | Ogunbona et al. |
| 2011/0029510 | A1 | 2/2011 | Kroon et al. |
| 2011/0032429 | A1* | 2/2011 | Bing .............. H04N 21/234381 348/608 |
| 2011/0182525 | A1 | 7/2011 | Fukuhara |
| 2012/0121192 | A1 | 5/2012 | Kim et al. |
| 2013/0215221 | A1* | 8/2013 | Wang ..................... G06T 7/579 348/43 |
| 2013/0288702 | A1 | 10/2013 | Abu et al. |
| 2014/0010407 | A1* | 1/2014 | Sinha ................. G06K 9/00664 382/103 |
| 2017/0085733 | A1* | 3/2017 | Ilic .......................... G06T 17/20 |
| 2017/0278546 | A1* | 9/2017 | Xiao ....................... G11B 27/34 |
| 2018/0189943 | A1* | 7/2018 | Fuse ................. H04N 5/23229 |

OTHER PUBLICATIONS

Chen D., et al., Memory-efficient Image Databases for Mobile Visual Search, <https://sites.google.com/' May 26, 2016 ~ 9 Pages.
David Chen et al., Dynamic Selection of a Feature-rich Query Frame for Mobile Video Retrieval, Jul. 5, 2010, < https://www.semanticscholar.org/paper/ ~ 4 pages.
Tiffany Yu-Han Chen at al., Glimpse: Continuous, Real-time Object Recognition on Mobile Devices, Nov. 1-4, 2015, < http://people.csail.mit.edu/ ~ 4 pages.
Yu Zhong et al., Real Time Object Scanning Using a Mobile Phone and Cloud-based Visual Search Engine, Oct. 2013, http://www.cs.cmu.edu/ ~ 8 pages.

* cited by examiner

IMAGE RECOGNITION AND RETRIEVAL

BACKGROUND

Mobile cloud computing is a new platform that combines mobile devices and cloud computing. Because of this new platform, a mobile device can be used to retrieve specific content from a large image database.

DESCRIPTION OF THE DRAWINGS

Certain examples are described in the following detailed description and in reference to the drawings, in which.

DETAILED DESCRIPTION

Most mobile devices have a camera that can capture video frames, prompting the integration of mobile devices and real-time image retrieval systems. Mobile devices capture images and send them to a cloud computing service which searches a large database for the same or similar images. The cloud computing service performs computing-intensive tasks and stores large amounts of data. This is beneficial in that data processing and data storage are accomplished external to the mobile devices.

However, existing techniques for integrating mobile devices and real-time image retrieval systems are inefficient. All images captured by a mobile device are sent to a cloud computing service. As a result, images of poor quality reach the image retrieval system, thereby increasing traffic to the system while interfering with the system's ability to accurately retrieve images.

Techniques are provided herein for discarding poor quality images, grouping the remaining images, and sending the groups of images to the image retrieval system. These techniques may result in better utilization of cloud resources in that fewer requests are made of the image retrieval system. Furthermore, these techniques may result in the improved accuracy of image retrieval.

For example, a mobile device captures a plurality of image frames. The plurality of image frames are subject to pre-processing such as downscaling, noise reduction, lighting correction, and the like. Image frames may be discarded if they do not meet specified quality thresholds. The quality thresholds apply to quality indicators such as blurriness, luminance, difference between image frames, descriptor size, and the like. The remaining set of image frames may be assembled into groups of a specified number. The features of a group of image frames are identified and sent to a content-based image retrieval (CBIR) server as a query. The query acts as a request of the CBIR server to search a large database for an image having the same or similar features as the images contained in the group of image frames.

The query includes the descriptors for the features of the image frames contained in the group of image frames. The large database is searched by comparing the descriptors for the features making up the query to the descriptors for images in the database. The image in the database having the majority of descriptor matches will be retrieved. The retrieved image will be the same or similar to the image frames in the group of image frames constituting the query.

Figure 1:
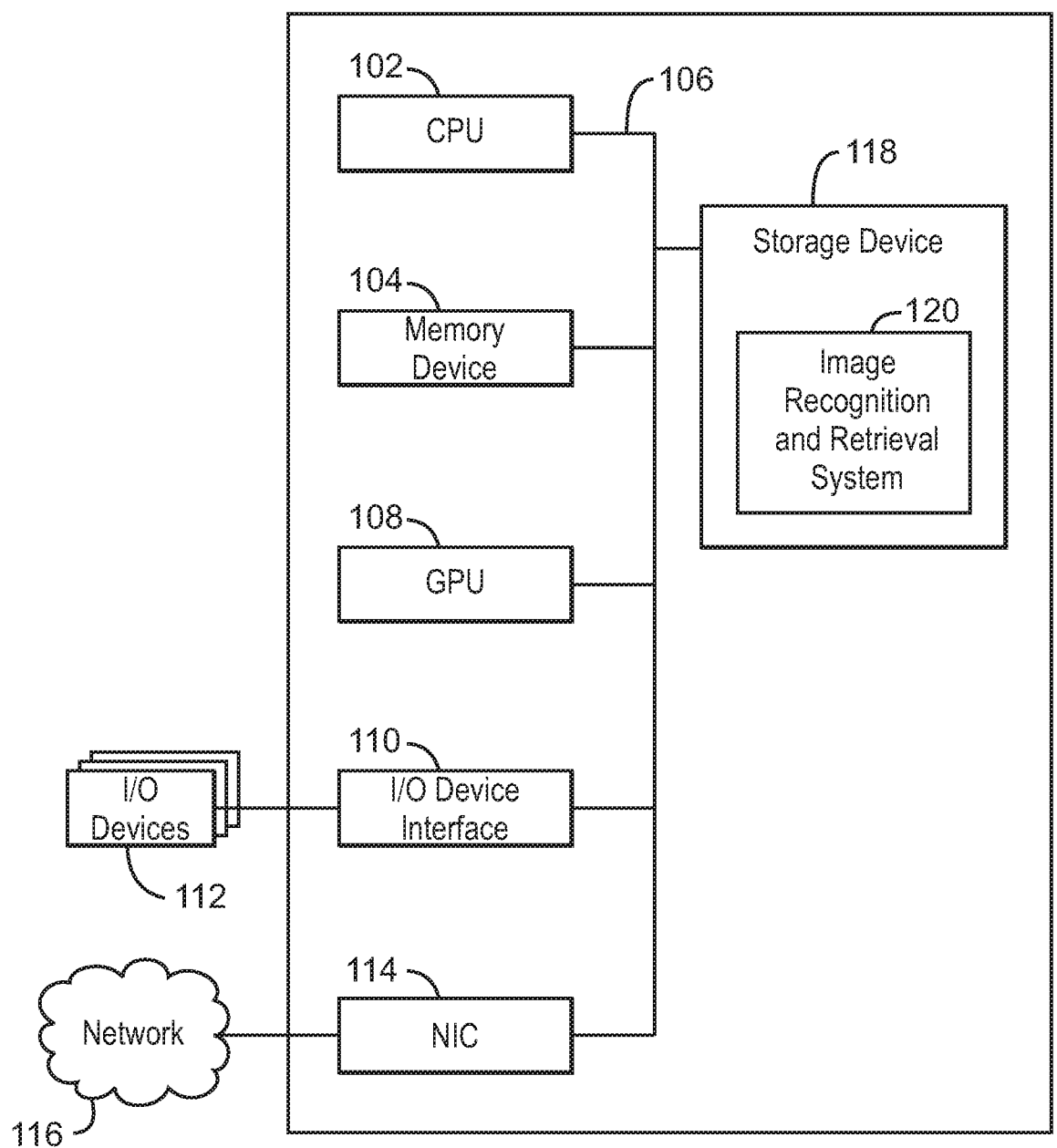
FIG. 1 is a block diagram of an example system for recognition and retrieval of images.

FIG. 1 is a block diagram of an example system for recognition and retrieval of images. The system 100 may be incorporated into any mobile device, such as a tablet computer, smartphone, and the like.

The system 100 may include a central processing unit (CPU) 102 that executes stored instructions, as well as a memory device 104 that stores the instructions that are executable by the CPU 102. The CPU 102 can be a single core processor, a dual-core processor, a multi-core processor, a number of processors, a computing cluster, and the like. The CPU 102 may be coupled to the memory device 104 by a bus 106 where the bus 106 may be a communication system that transfers data between various components of the system 100. In examples, the bus 106 may include a Peripheral Component Interconnect (PCI) bus, an Industry Standard Architecture (ISA) bus, a PCI Express (PCIe) bus, high performance links, such as the Intel® Direct Media Interface (DMI) system, and the like.

The memory device 104 can include random access memory (RAM), e.g., static RAM (SRAM), dynamic RAM (DRAM), zero capacitor RAM, embedded DRAM (eDRAM), extended data out RAM (EDO RAM), double data rate RAM (DDR RAM), resistive RAM (RRAM), and parameter RAM (PRAM); read only memory (ROM), e.g., mask ROM, programmable ROM (PROM), erasable programmable ROM (EPROM), and electrically erasable programmable ROM (EEPROM); flash memory; or any other suitable memory system.

The system 100 may also include a graphics processing unit (GPU) 108. As shown, the CPU 102 may be coupled to the GPU 108 via the bus 106. The GPU 108 may be configured to perform any number of graphics operations. For example, the GPU 108 may be configured to pre-process the plurality of image frames by downscaling, reducing noise, correcting lighting, and the like.

The system 100 may also include an input/output (I/O) device interface 110 configured to connect the system 100 to one or more I/O devices 112. For example, the I/O devices 112 may include a printer, a scanner, a keyboard, and a pointing device such as a mouse, touchpad, or touchscreen, among others. The I/O devices 112 may be built-in components of the system 100, or may be devices that are externally connected to the system 100.

The system 100 may also include a network interface controller (NIC) 114 configured to connect the system 100 to a network 116. The network 116 may be a wide area network (WAN), local area network (LAN), or the Internet, among others. For example, the NIC 114 may connect the system 100 to a cloud computing service where data processing and data storage occur, external to the mobile device containing system 100.

The system 100 may also include a storage device 118. The storage device 118 may include non-volatile storage devices, such as a solid-state drive, a hard drive, a tape drive, an optical drive, a flash drive, an array of drives, or any combinations thereof. In some examples, the storage device 118 may include non-volatile memory, such as non-volatile RAM (NVRAM), battery backed up DRAM, and the like. In some examples, the memory device 104 and the storage device 118 may be a single unit, e.g., with a contiguous address space accessible by the CPU 102.

The storage device 118 may include an image recognition and retrieval system 120. The image recognition and retrieval system 120 may provide the system 100 with the capability to recognize and retrieve images that are the same or similar to the query images. For example, a mobile device may perform functions associated with the image recognition and retrieval system 120. The mobile device may capture a plurality of image frames, pre-preprocess the plurality of image frames to improve quality, eliminate image frames that do not meet a quality threshold, group images, and identify features of the images constituting a group of images, and send a request to a server. In this manner, only the features of good quality image frames are grouped and sent to the server. The remaining functions of the image recognition and retrieval system 120 may be performed on the server. The request sent to the server may be in the form of a query containing the features of the images contained in the group of images. A search of an image database stored on the server may be performed by comparing the features in the query to the features of the images in the database. The search may yield the image in the database that is the same or similar to the images in the query.

The block diagram of FIG. 1 is not intended to indicate that the system 100 for recognizing and retrieving images is to include all the components shown. Further, any number of additional units may be included within the system 100 depending on the details of the specific implementation.

Figure 2:
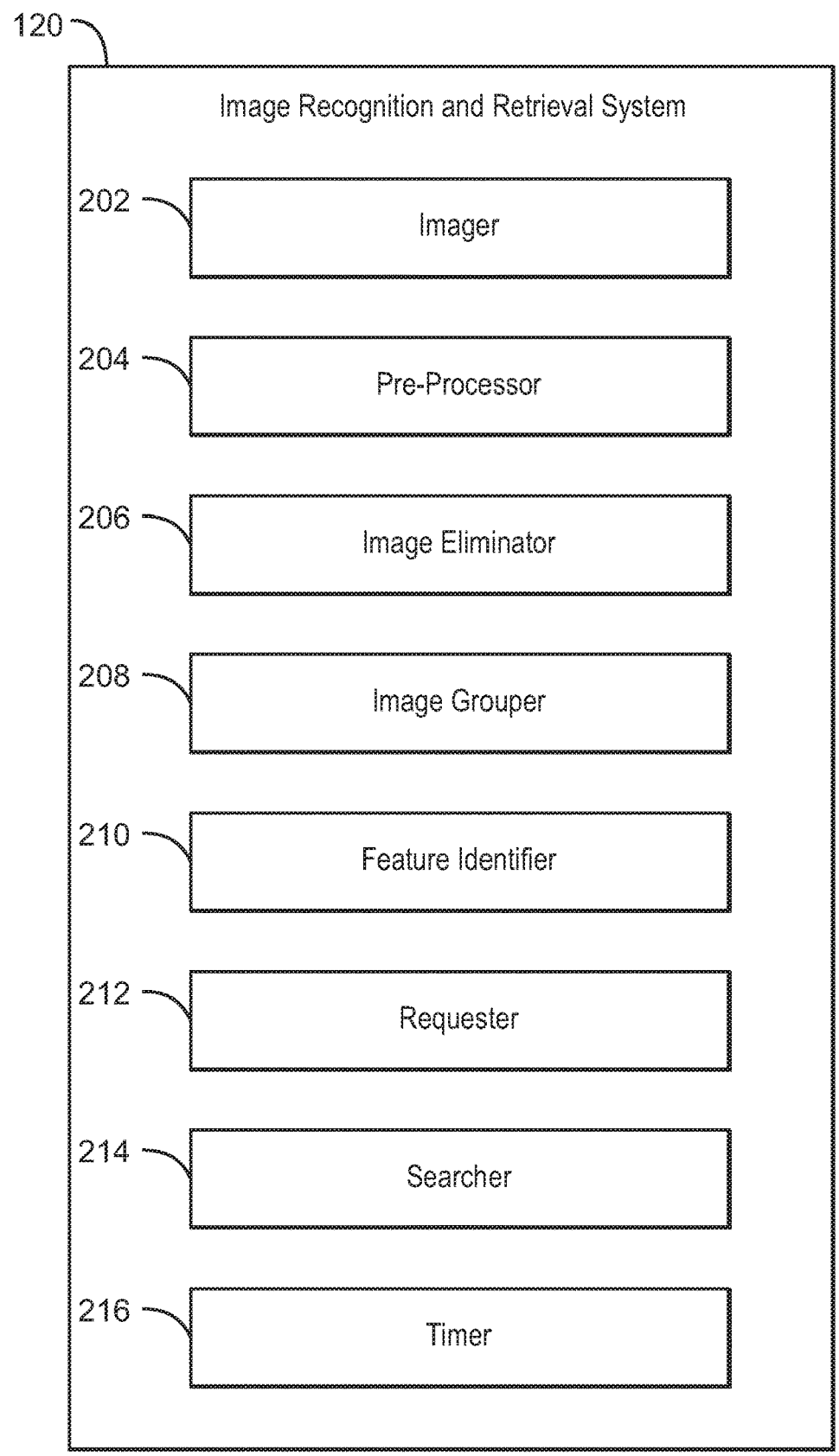
FIG. 2 is a block diagram of an example image recognition and retrieval system.

FIG. 2 is a block diagram of an example image recognition and retrieval system. The units may be software modules, hardware encoded circuitry, or a combination thereof. For example, an imager 202 may capture a plurality of image frames. In embodiments, the imager 202 may be a camera that is a component of a mobile device.

The plurality of image frames may be subjected to downscaling, noise reduction, lighting correction, and the like by a pre-processor 204. The pre-processor 204 may improve the quality of some or all of the plurality of image frames. An image eliminator 206 may discard any image frame that does not meet specified quality thresholds. The image eliminator 206 may compare an image frame's blurriness, luminance, difference from other frames, descriptor size, and the like to specified thresholds. An image frame not meeting all of the specified thresholds may be discarded.

The remaining image frames may be combined into groups of a specified number by an image grouper 208. The features of a group of image frames are identified by a feature identifier 210. Feature identification may be performed using the Oriented FAST and Rotated BRIEF (ORB) method. ORB is a fusion of the FAST (Features from Accelerated Segment Test) keypoint detector and the BRIEF (Binary Robust Independent Elementary Features) descriptor. ORB uses FAST to locate keypoints, such as corners, in an image. A corner is a point in an image having two dominant and different edge directions in a local neighborhood of the point. FAST locates keypoints in an image by comparing the intensity threshold between a center pixel and those pixels in a circular ring surrounding the center. The FAST keypoints may be ordered by applying the Harris corner measure. ORB uses the intensity centroid as a measure of corner orientation. It is assumed that a corner's intensity is offset from its center and the vector constructed from the corner's center to the centroid can be used to impute orientation. The orientation of the FAST keypoints is then used to make BRIEF invariant to in-plane rotation. The result is called steered BRIEF.

The BRIEF descriptor is a bit string description of an image patch constructed from a set of binary intensity tests. High variance among the tests in the BRIEF vector is desirable if BRIEF is to perform effectively. Steered BRIEF has a variance significantly lower than that required for effective performance. In ORB, a learning method is performed to recover from the loss of variance in steered BRIEF and to reduce correlation among the binary tests. The method searches among all possible binary tests to find tests that have high variance and are uncorrelated. The result, called rBRIEF, is a vector containing 256 tests and describes a feature of an image. Vectors are compiled for each keypoint, i.e., corner, in an image. The vectors are 256-bit descriptors for the keypoints.

The descriptors supplied by the feature identifier 210 may be sent to a content-based image retrieval (CBIR) server by the requester 212. The descriptors may serve as a query and the searcher 214, a component of the CBIR server, may search a large database on the server to locate images with the same descriptors as the query images. For example, the large database may be searched by comparing the descriptors for the image frames in the group of image frames to the descriptors for the images in the database. The search may actually be a series of searches in that each descriptor in the query is searched for separately. A scoring method may be used to score each database image according to the number of descriptors for the database image that match descriptors in the query. The database image having the highest score for the majority of searches may be retrieved. The retrieved image may be the same as or similar to the image frames constituting the group of image frames.

A timer 216 may determine if a query has been sent to the CBIR server within a specified interval. For example, the interval may be three seconds. If a query has not been sent to the CBIR server within the three seconds, the descriptors for the features of a partial group of images may be sent to the server. In some examples, the image grouper 208 may combine images into groups of three and the descriptors for the features of the three images may be forwarded to the CBIR server as a query. If a query has not been sent to the server within three seconds, the descriptors for the features of one or two images may be sent to the server instead of the descriptors for the features of a full group of three image frames.

Figure 3:
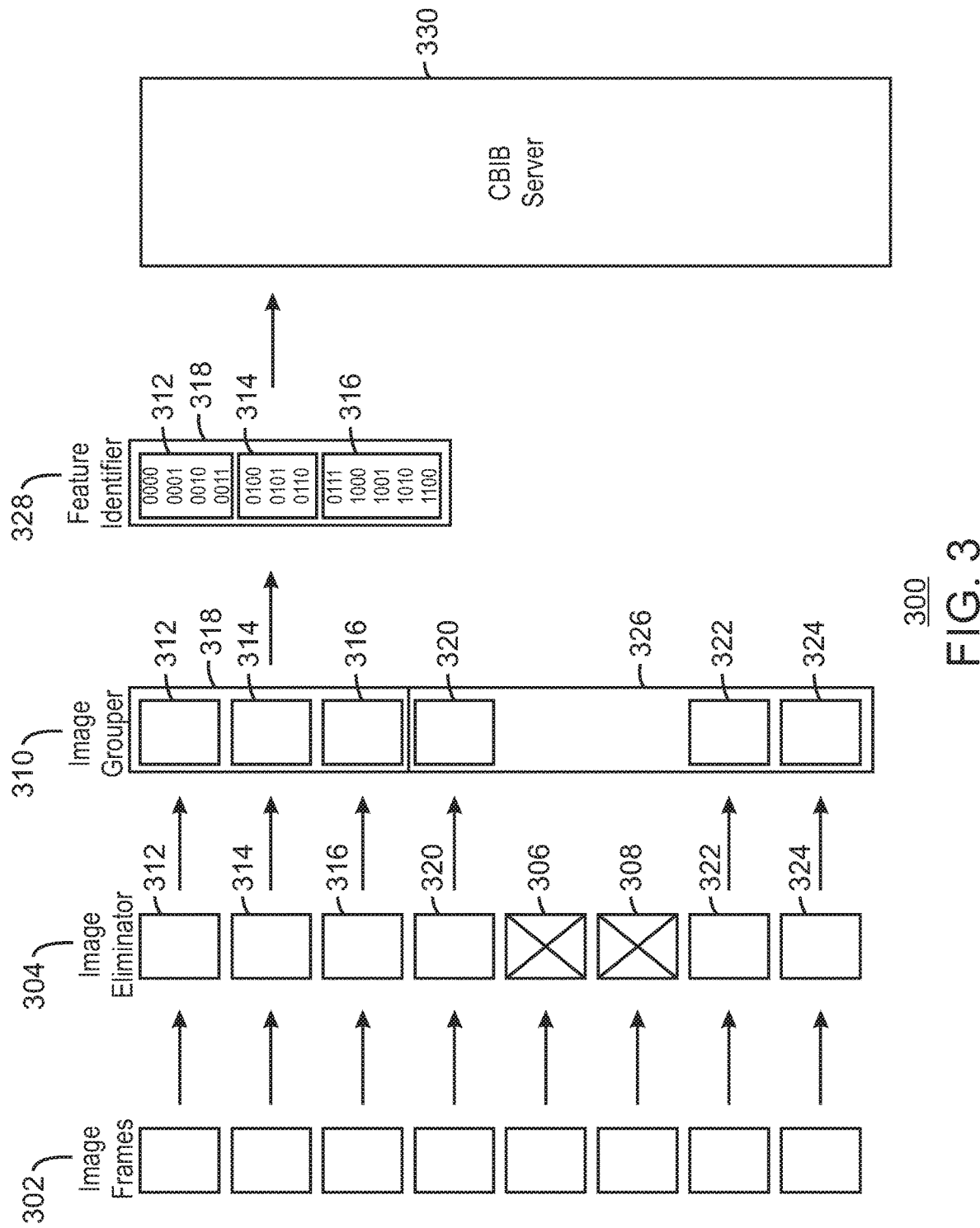
FIG. 3 is diagram showing the operations performed by the image recognition and retrieval system.

FIG. 3 is diagram showing the operations performed by the image recognition and retrieval system. The first column 302 represents a series of image frames captured by an imager 202. The second column 304 depicts the functioning of the image eliminator 206. Image frames 306 and 308 have been discarded because they do not meet all of the specified quality thresholds. For example, image frame 306 may be too blurry and image frame 308 may be too light.

The third column 310 shows the action of the image grouper 208. The first three images frames 312, 314, and 316 have survived elimination by image eliminator 206 and are combined as a first group 318 by the imager grouper 208. In this example, the image grouper 208 combines images into groups of three. Because image frames 306 and 308 have been discarded, the image grouper 208 has combined image frames 320, 322, and 324 to form a second group 326. Had image frames 306 and 308 not been eliminated, the second group 326 would have included image frames 320, 306, and 308. In this manner, only groups of three good quality images reach the feature identifier 210.

The fourth column 328 depicts the functioning of the feature identifier 210. The feature identifier 210 identifies the features of each image in the first group 318 of three images and provides descriptors for those features. The feature identifier 210 may use the ORB (Oriented FAST and Rotated BRIEF) method to identify and describe features of each image. ORB is a fusion of the FAST (Features from Accelerated Segment Test) keypoint detector and the BRIEF (Binary Robust Independent Elementary Features) descriptor.

The descriptors that result from the ORB method may be 256 bits long. In FIG. 3, the descriptors are shortened for illustrative purposes. For example, the descriptors for image 312 in the first group 318 are 0000, 0001, 0010, and 0011. Descriptors are also given for images 314 and 316. The first group 318 of feature descriptors is a query that is sent to the CBIR server 330 by the requester 212. The searcher 214 searches a database on the CBIR server 330 to find an image having descriptors that match the descriptors for the images in the first group 318.

Figure 4A:
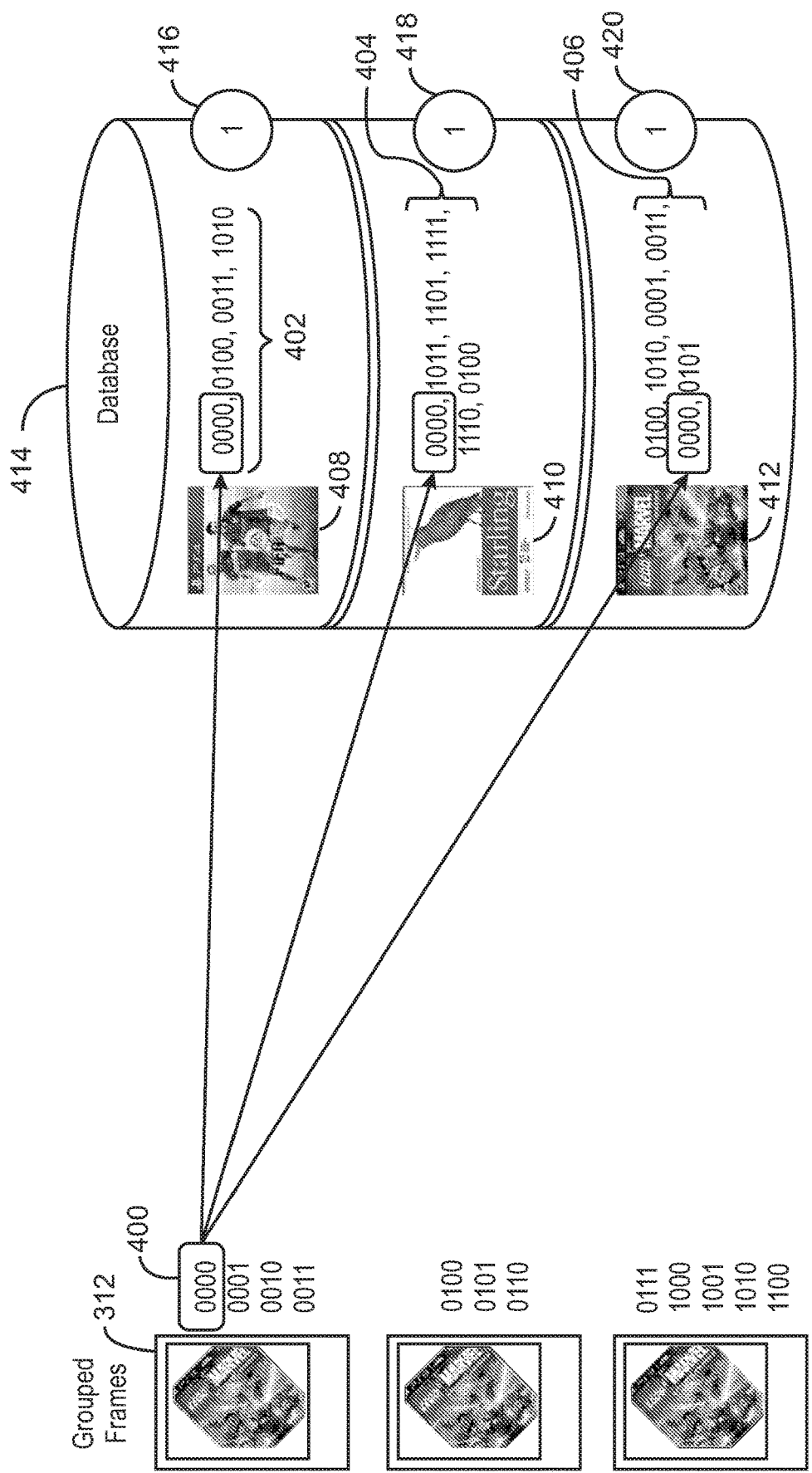
FIGS. 4A-4G show an example of a search process.

FIGS. 4A-4G show an example of a search process. In FIG. 4A, the first descriptor 400 of the first image 312 is compared to the descriptors 402, 404, and 406 for the images 408, 410, and 412 making up the database 414. In this example, descriptor 400 is among the descriptors 402, 404, and 406. As a result, images 408, 410, and 412 are each given a score 416, 418, and 420 of 1.

Figure 4B:
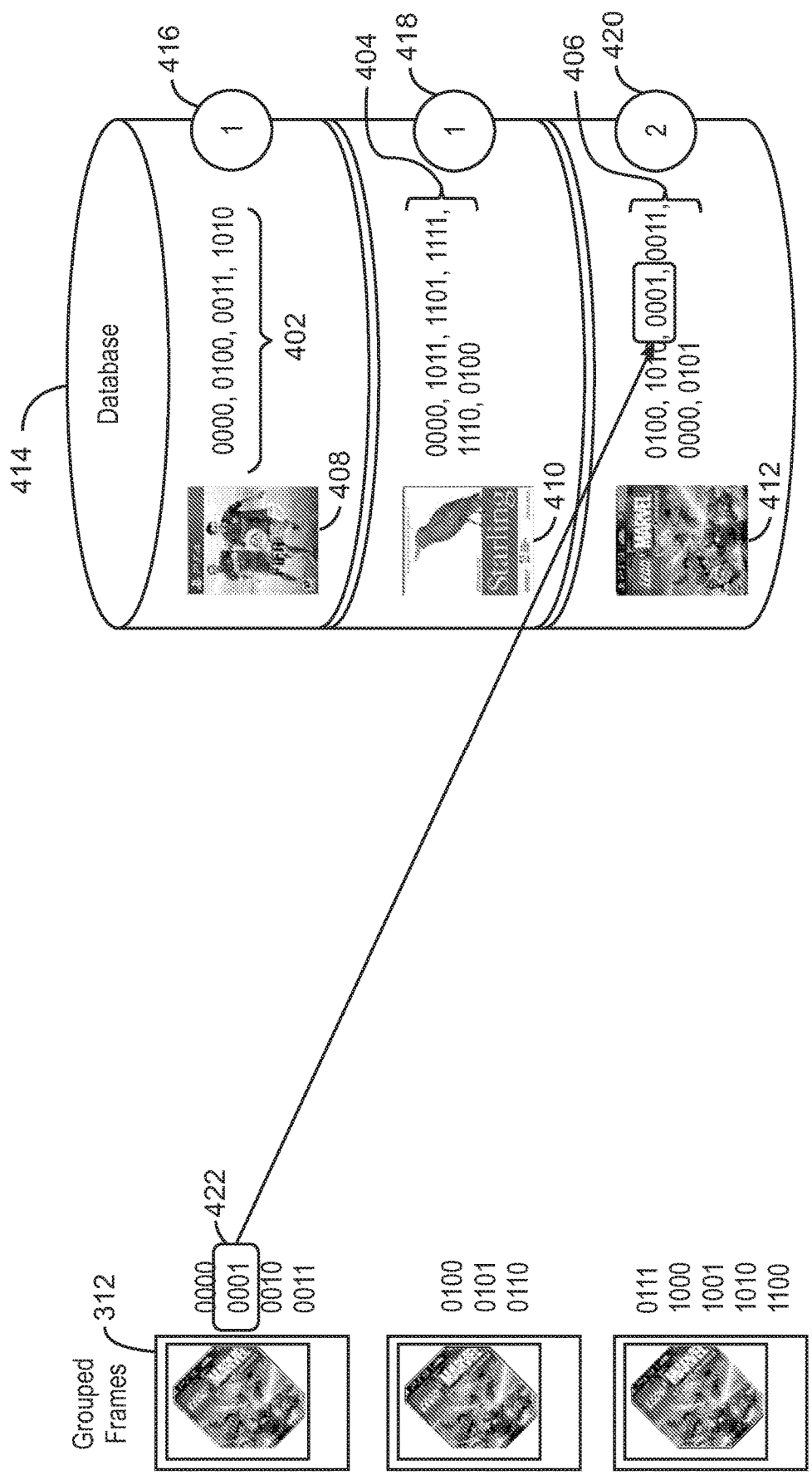

In FIG. 4B, the second descriptor 422 of the first image 312 is compared to the descriptors 402, 404, and 406 for the images 408, 410, and 412 making up the database 414. In this instance, descriptor 422 is found only among the descriptors 406 for image 412. As a result, the score 420 for image 412 is incremented by 1.

Figure 4C:
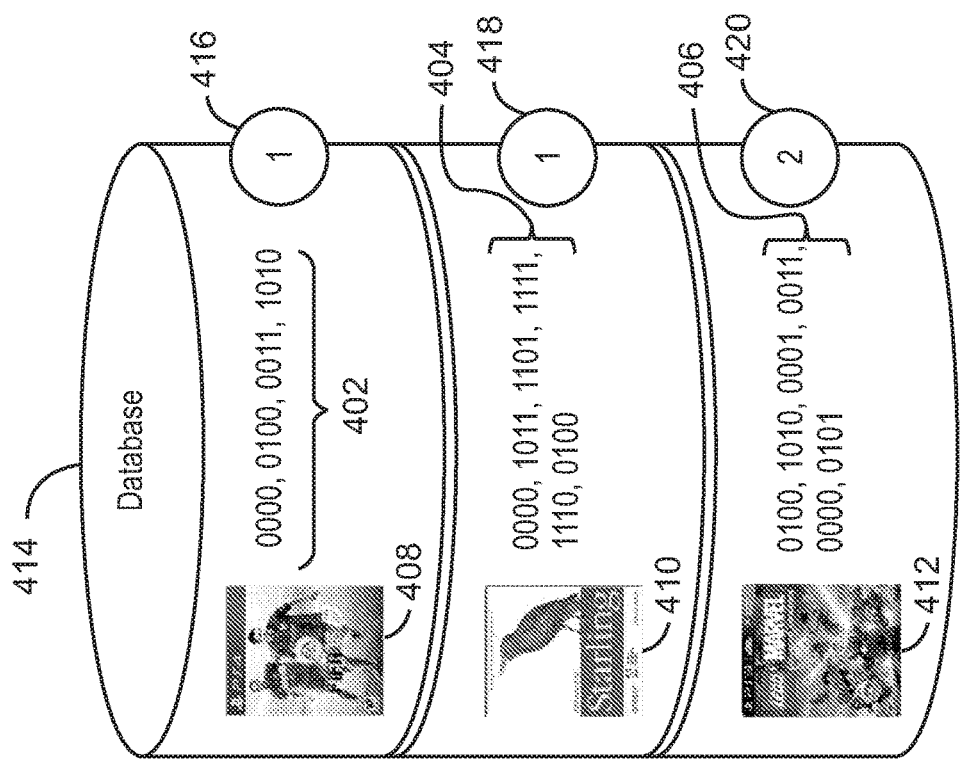
Figure 4C:
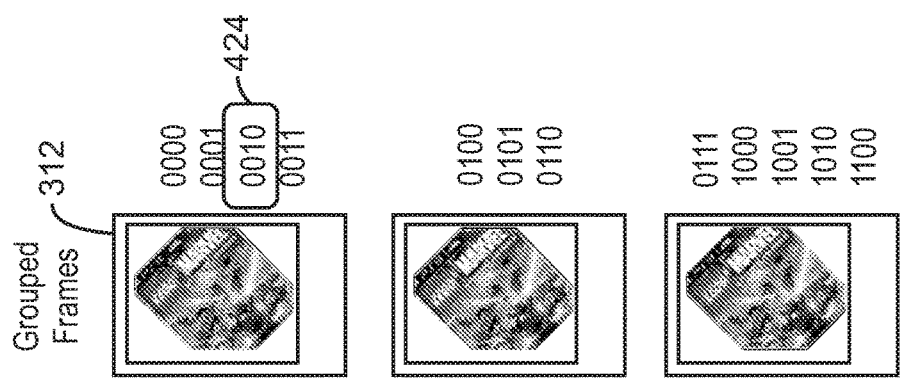

In FIG. 4C, the third descriptor 424 of the first image 312 is compared to the descriptors 402, 404, and 406 for the images 408, 410, and 412 making up the database 414. The descriptor 424 is not among any of the descriptors 402, 404, and 406 for the images 408, 410, and 412. None of the scores 416, 418, and 420 are increased.

Figure 4D:
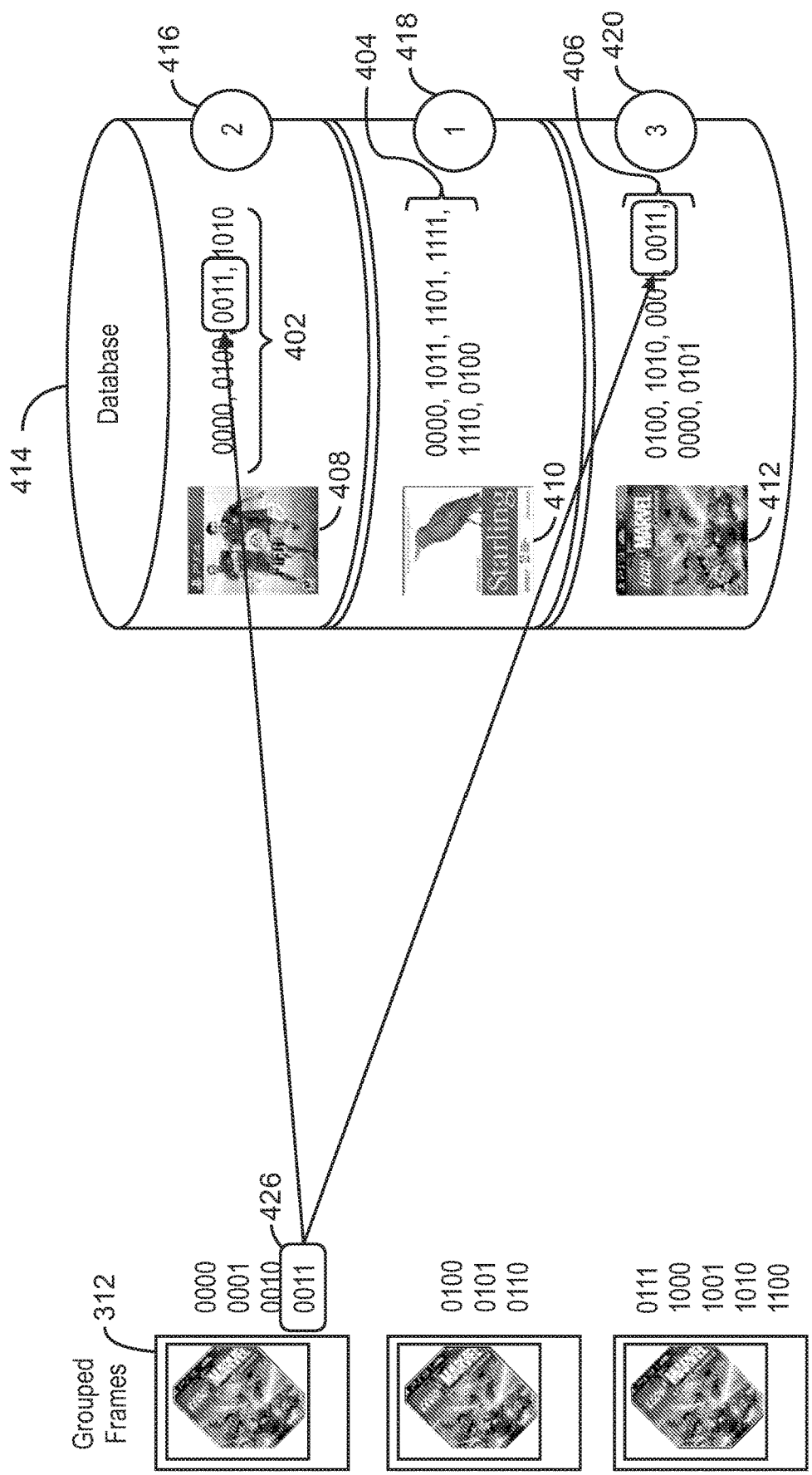

In FIG. 4D, the fourth descriptor 426 of the first image 312 is compared to the descriptors 402, 404, and 406 for the images 408, 410, and 412 making up the database 414. Descriptor 426 is located among the descriptors 402 for image 408 and the descriptors 406 for image 412. Consequently, the score 416 for image 408 and the score 420 for image 412 are incremented by 1. With a score 420 of 3, image 412 has the highest score and is probably the image sought by the user of the mobile device.

Figure 4E:
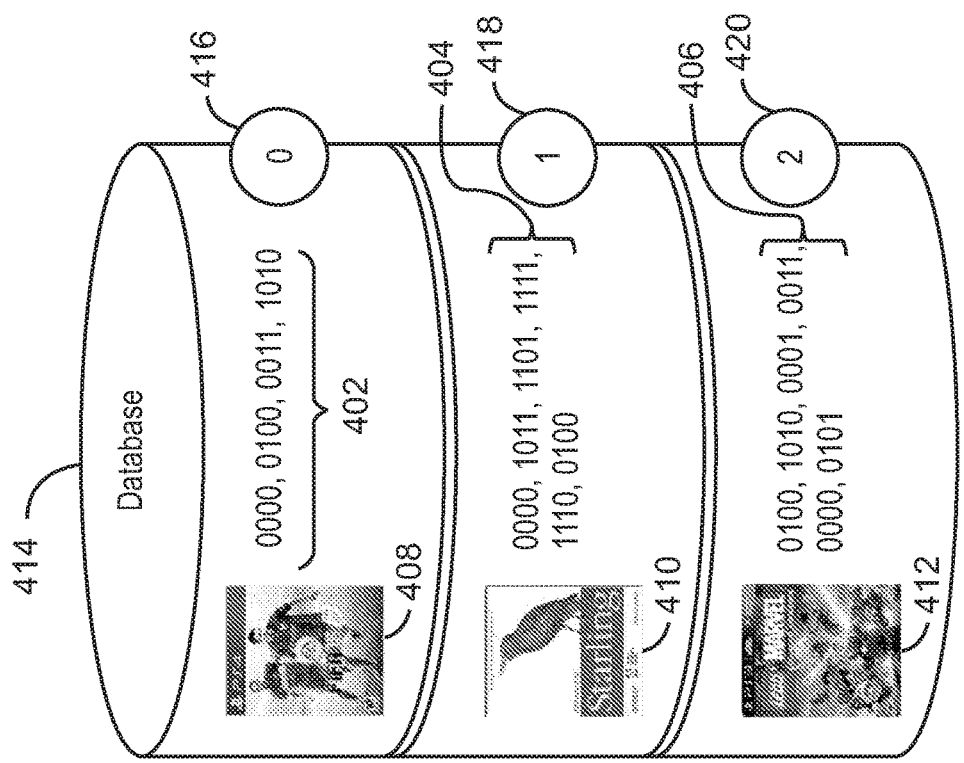
Figure 4E:
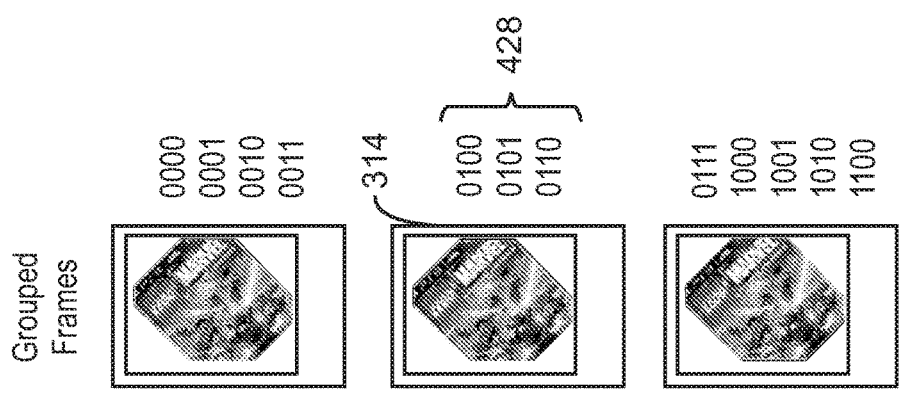

As shown in FIG. 4E, the search continues by comparing the descriptors 428 for the second image 314 to the descriptors 402, 404, and 406 for the images 408, 410, and 412 making up the database 414. The search is executed as explained above. Each of descriptors 428 is compared to the descriptors 402, 404, and 406 for the images 408, 410, and 412 and the scores 416, 418, are 420 are incremented accordingly. After the comparisons are complete, the scores 416, 418, and 420 for images 408, 410, and 412 are 0, 1, and 2. Once again, the score 420 for image 412 is the highest, which indicates that image 412 is probably the mage sought by the user of the mobile device.

Figure 4F:
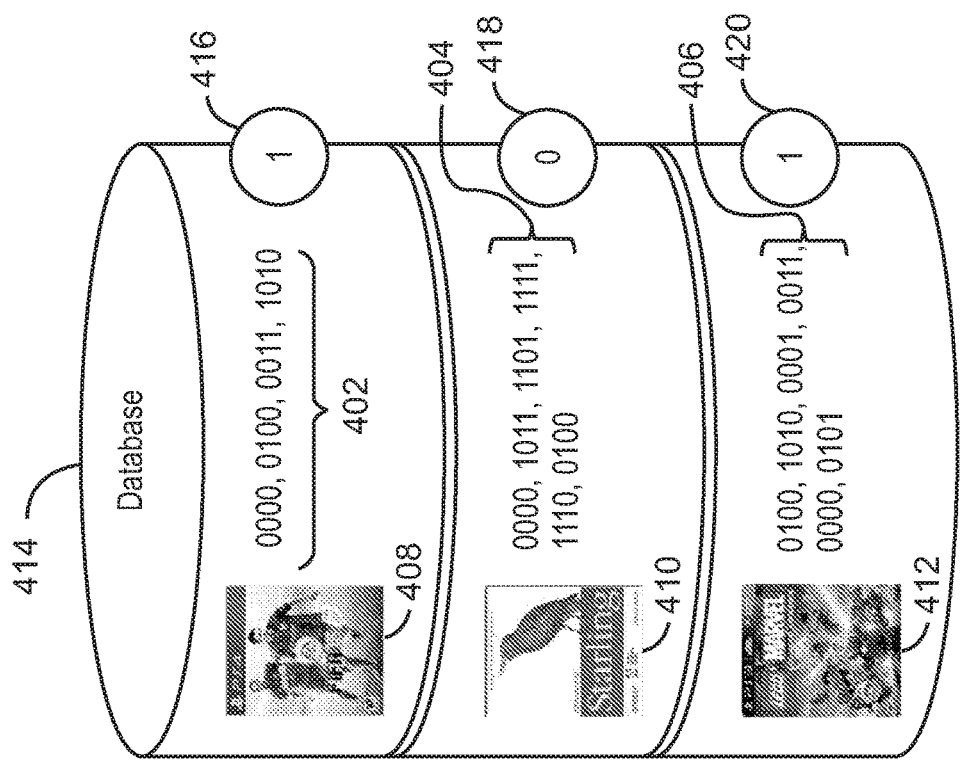
Figure 4F:
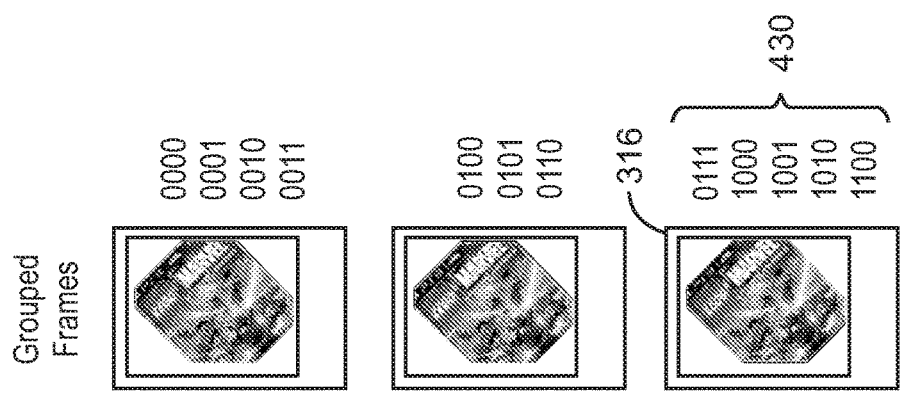

As shown in FIG. 4F, the search continues by comparing the descriptors 430 for the third image 316 to the descriptors 402, 404, and 406 for the images 408, 410, and 412 making up the database 414. The search is executed as explained above. Each of descriptors 430 is compared to the descriptors 402, 404, and 406 for the images 408, 410, and 412 and the scores 416, 418, are 420 are incremented accordingly.

After the comparisons are complete, the scores 416, 418, and 420 for images 408, 410, and 412 are 1, 0, and 1. The results are inconclusive in that there is no high score. The search for descriptors 430 does not provide an indication of which of images 408, 410, or 412 is probably the image sought by the user of the mobile device.

Figure 4G:
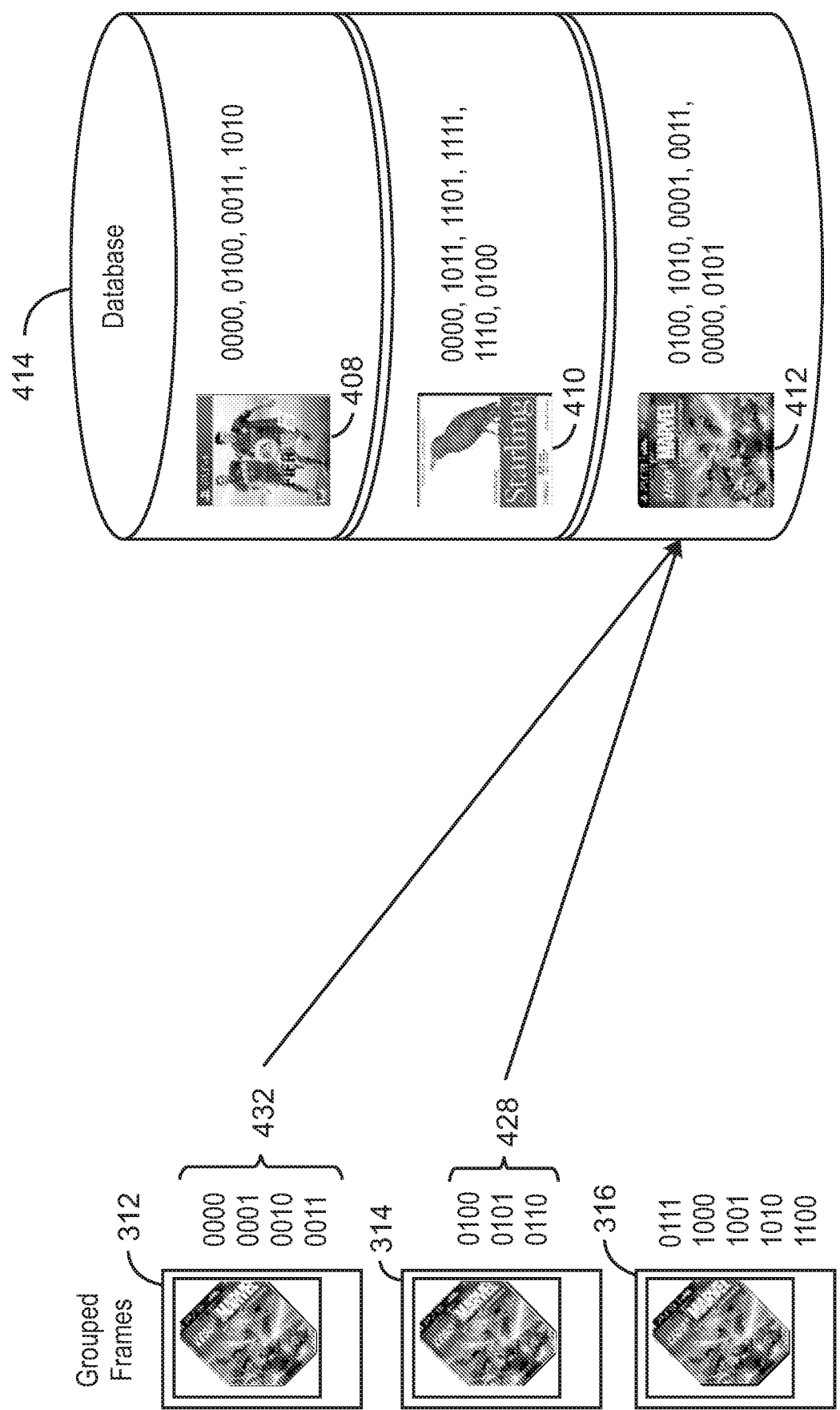

FIG. 4G shows the outcome of the search for the image that matches the grouped images 312, 314, and 316. The outcome is based on the majority of the results. The search for the descriptors 432 for image 312 and the search for the descriptors 428 for image 314 both indicate that image 412 in database 414 is probably a match to grouped images 312, 314, and 316. Hence, image 412 is presented to the user as the outcome of the search.

The search involves the comparison of the descriptors for three images to the descriptors for the images in the database on the CBIR server. The outcome of the search is more certain than is the outcome of searches using existing techniques, which compare the descriptors for only one image to the descriptors for the database images.

Figure 5A:
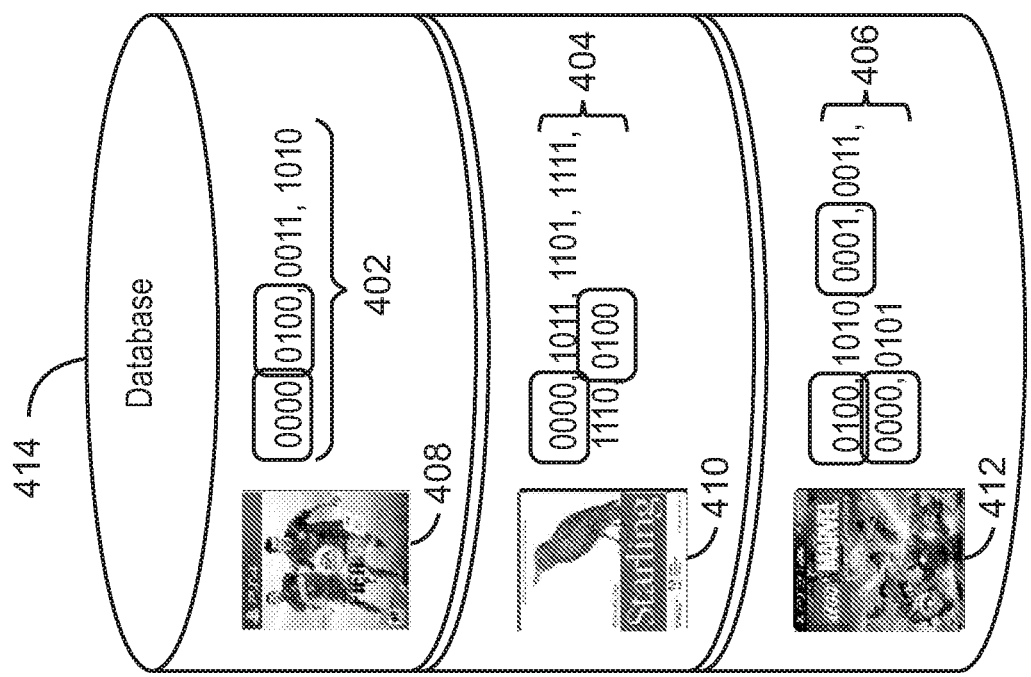
FIGS. 5A-5C show examples of variations on the search process depicted in FIGS. 4A-4G.
Figure 5A:
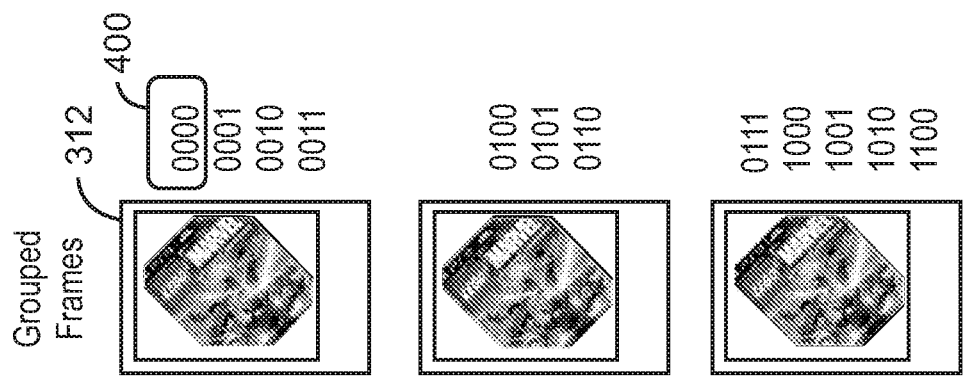
Figure 5B:
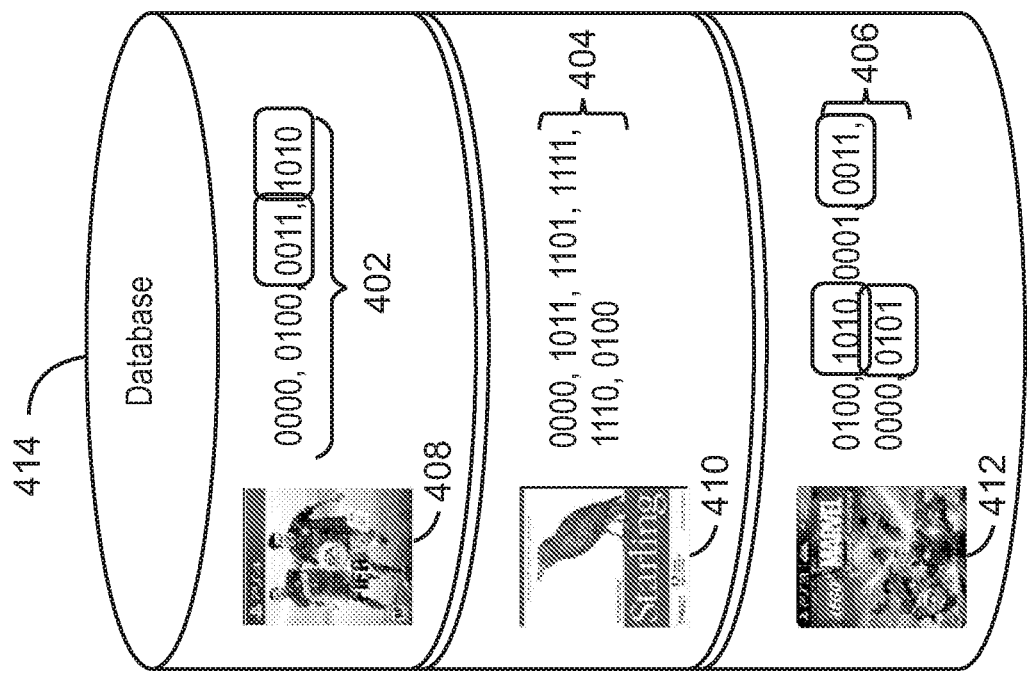
Figure 5B:
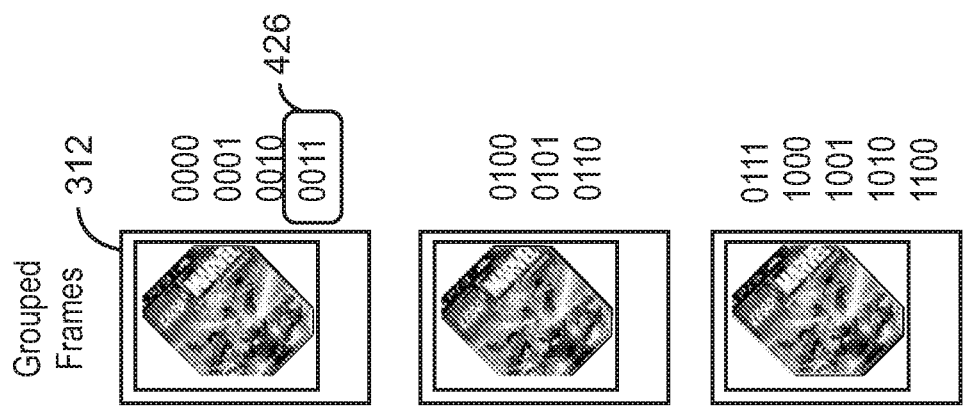
Figure 5C:
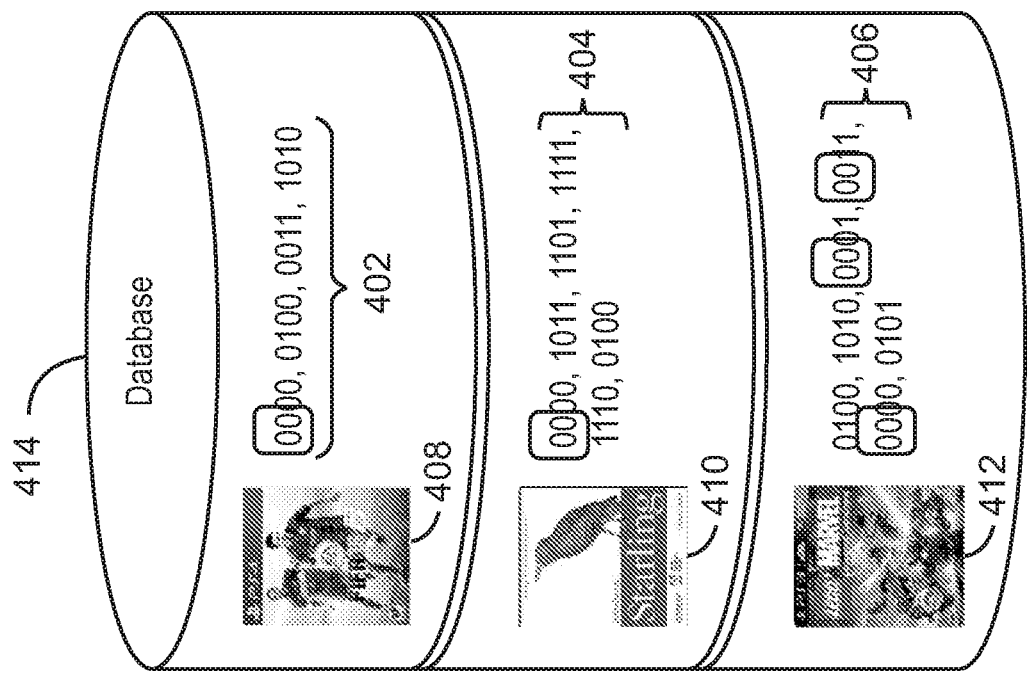
Figure 5C:
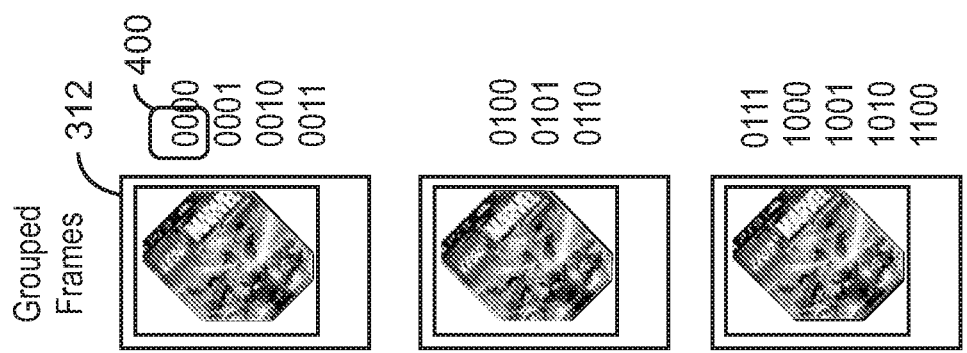

FIGS. 5A-5C show examples of variations on the search process depicted in FIGS. 4A-4G. In FIG. 5A, a maximum Hamming distance is used as the search criterion. The Hamming distance between descriptors is the number of positions at which the corresponding bits are different. For example, 1001 and 1001 have a Hamming distance of zero; 1001 and 1101 have a Hamming distance of one; and 1001 and 1100 have a Hamming distance of two. Searching using Hamming distances involves finding descriptors that have a specified maximum Hamming distance. In FIG. 5A, the specified maximum Hamming distance is one. In particular, the descriptor 400 for image 312 is compared to the descriptors 402, 404, and 406 for images 408, 410, and 412 in the database 414. The search identifies any descriptor among the descriptors 402, 404, and 406 having a Hamming distance of either zero or one with the descriptor 400. The search results are indicated in FIG. 5A. The search then continues as explained above.

In FIG. 5B, the same number of active bits is the search criterion. The descriptor 426 for image 312 is 0011, which means that it has two ones and two zeroes. The search identifies any descriptor among the descriptors 402, 404, and 406 also having two ones and two zeroes. The search results are indicated in FIG. 5B. The search then continues as explained above.

FIG. 5C uses multiple index tables as part of the searching process. Multiple index tables are involved in the search for descriptors that have the same fixed part. For example, in FIG. 5C, the descriptor 400 for image 312 starts with two zeroes. Two leading zeroes form a fixed part. The search identifies any descriptor among the descriptors 402, 404, and 406 having the same fixed part, i.e., two leading zeroes. The search results are indicated in FIG. 5C. The search then continues as explained above.

A search process has been explained with respect to FIGS. 4A-4G. Variations on this simple process are depicted in FIGS. 5A-5C. As is known to one skilled in the art, many other approaches may be used to perform searches based on image descriptors.

Figure 6:
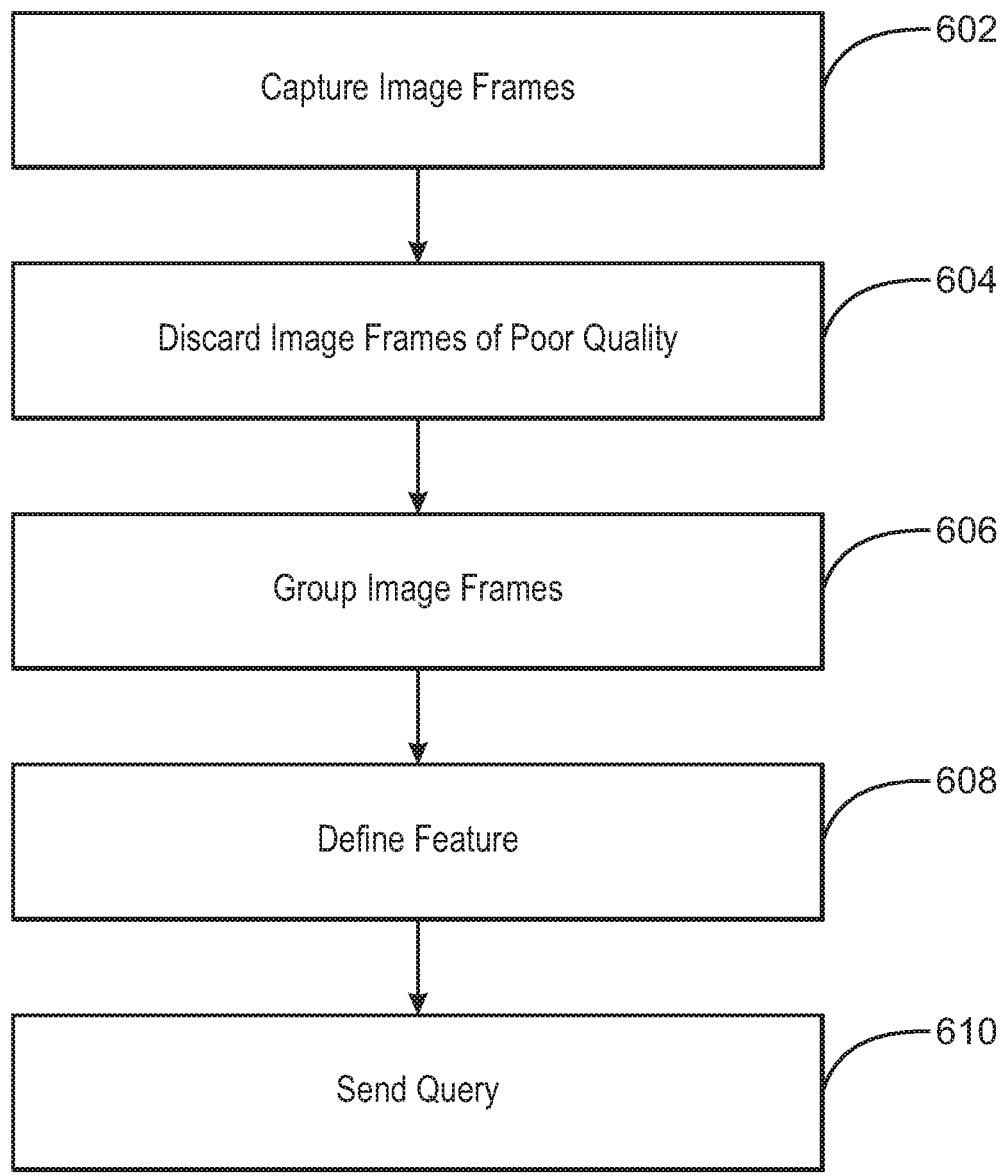
FIG. 6 is a process flow diagram of an example method for image recognition and retrieval.

FIG. 6 is a process flow diagram of an example method 600 for image recognition and retrieval. The method 600 may be performed by the system 100 described with respect to FIG. 1.

The method 600 begins at block 602 with the capture of a plurality of image frames. At block 604, image frames of poor quality are discarded. Poor quality is defined as failing to meet a specified quality threshold. At block 606, the remaining image frames are grouped into groups of a specified number. At block 608, features of a group of image frames are defined; i.e., identified and described using binary descriptors. At block 610, a query is sent to a content-based image retrieval server. The query constitutes the descriptors for the features of the group of image frames.

The process flow diagram of FIG. 6 is not intended to indicate that the method 600 for image recognition and retrieval is to include all the blocks shown. Further, any number of additional blocks may be included within the method 600 depending on the details of the specific implementation.

Figure 7:
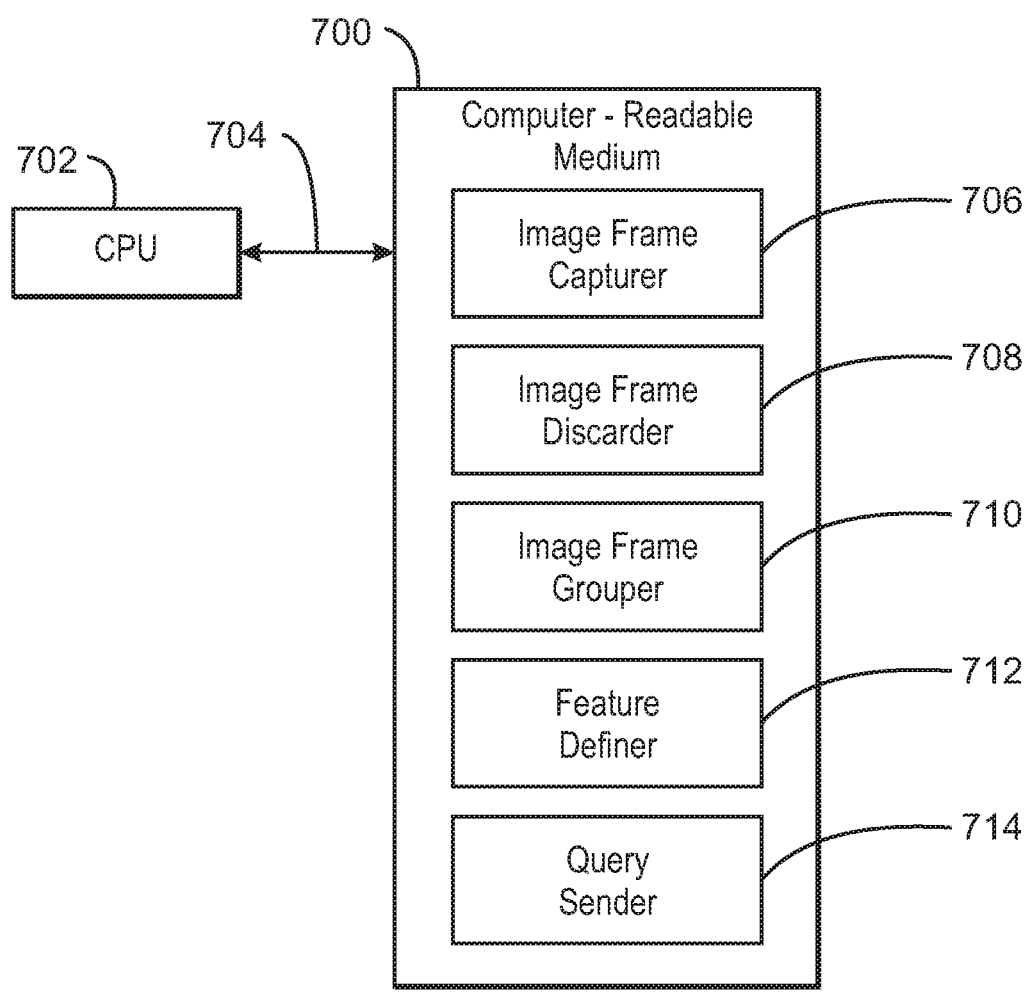
FIG. 7 is a block diagram of an example memory storing non-transitory, machine-readable instructions comprising code to direct one or more processing resources to recognize and retrieve images.

FIG. 7 is a block diagram of an example memory 700 storing non-transitory, machine-readable instructions comprising code to direct one or more processing resources to recognize and retrieve images. The memory 700 is coupled to one or more central processing units (CPUs) 702 over a bus 704. The CPU 702 and bus 704 may be as described with respect to the CPU 102 and bus 106 of FIG. 1.

The memory 700 includes an image frame capturer 706 to direct one of the one or more CPUs 702 to capture a plurality of image frames. Image frame discarder 708 directs one of the one or more CPUs 702 to discard any image frame in the plurality of image frames not meeting a specified quality threshold. The memory 700 may also include an image frame grouper 710 to direct one of the one or more CPUs 702 to group the remaining set of image frames into groups of a specified number. Feature definer 712 may direct one of the one or more CPUs 702 to identify and describe features of a group of image frames. Query sender 714 may direct one of the one or more processors 702 to send a query to a content-based image retrieval server. The query may include the descriptors for features of the group of image frames.

The code blocks described above do not have to be separated as shown; the code may be recombined into different blocks that perform the same functions. Further, the machine-readable medium does not have to include all of the blocks shown in FIG. 7. However, additional blocks may be added. The inclusion or exclusion of certain code blocks is dictated by the details of the specific implementation.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A computing device comprising:
an imager to capture a plurality of image frames;
a processor; and
a non-transitory computer readable storage medium storing instructions that are executable to cause the processor to:
discard any image frame of the plurality of image frames that does not meet a specified quality threshold;
after discarding any image frame that does not meet the specified quality threshold, group remaining image frames of the plurality of image frames into groups of image frames, including a first group of image frames, wherein each group has a specified number of image frames;
identify features of the image frames in the first group of image frames;
generate descriptors describing the features of the image frames in the first group of image frames; and
send a query to a server to retrieve an image frame stored in the server that matches the first group of image frames, the query comprising the descriptors describing the features of the image frames in the first group of image frames.

2. The computing device of claim 1, wherein the instructions are executable to cause the processor to:
prior to discarding any image frame that does not meet the specified quality threshold, treat the plurality of image frames to improve quality of the plurality of image frames.

3. The computing device of claim 1, wherein the descriptors include a string of binary bits describing a feature of each image frame in the first group of image frames.

4. The computing device of claim 1, wherein the specified quality threshold is a threshold related to blurriness, luminance, difference between image frames, or descriptor size.

5. The computing device of claim 1, wherein the specified number of image frames in each group is three image frames.

6. The computing device of claim 1, wherein, to identify the features of the image frames in the first group of image frames, the instructions are executable to cause the processor to utilize an Oriented FAST and Rotated Brief (ORB) method to identify a feature of each image frame in the first group of image frames.

7. The computing device of claim 1, wherein the instructions are executable to cause the processor to determine if the query is sent to the server within a specified time interval.

8. The computing device of claim 7, wherein the instructions are executable to cause the processor to send a descriptor of a feature of a current image frame to the server in response to a determination that the query is not sent to the server within the specified time interval.

9. The computing device of claim 1, wherein the server searches for an image frame having descriptors that match the descriptors describing the image frames in the first group of image frames.

10. A method for image recognition and retrieval, comprising:
capturing, by a camera of a computing device, a plurality of image frames;
discarding, by a processor of the computing device, any image frame of the plurality of image frames that does not meet a specified quality threshold;
after discarding any image frame that does not meet the specified quality threshold, grouping, by the processor, remaining image frames of the plurality of image frames into groups, each group having a specified number of image frames, including a first group of image frames;
identifying, by the processor, features of the image frames in the first group of image frames;
generating, by the processor, descriptors describing the features of the image frames in the first group of image frames; and
sending, by the processor, a query to a server to retrieve an image frame stored in the server that matches the first group of image frames, the query comprising the descriptors describing the features of the image frames in the first group of image frames.

11. The method of claim 10, further comprising:
prior to discarding any image frame that does not meet the specified quality threshold, treating the plurality of image frames to improve quality of the plurality of image frames.

12. The method of claim 10, further comprising:
determining whether the query is sent to the server within a specified time period; and
sending a descriptor of a feature of a current image frame to the server in response to a determination that the query is not sent to the server within the specified time period.

13. A non-transitory computer readable storage medium storing machine-readable instructions that, when executed, cause a processor to:
capture a plurality of image frames;
discard any image frame of the plurality of image frames that does not meet a specified quality threshold;
after discarding any image frame that does not meet the specified quality threshold, group remaining image frames of the plurality of image frames into groups of image frames, including a first group of image frames, wherein each group has a specified number of image frames;
define features of the image frames in the first group of image frames;
generate descriptors describing the features of the image frames in the first group of image frames; and
send a query to a server to retrieve an image frame stored in the server that matches the first group of image frames, the query comprising the descriptors describing the features of the image frames in the first group of image frames.

14. The non-transitory computer readable storage medium of claim 13, wherein the machine-readable instructions are executable to cause the processor to:
prior to discarding any image frame that does not meet the specified quality threshold, treat the plurality of image frames to improve quality of the plurality of image frames.

15. The non-transitory computer readable storage medium of claim 13, wherein the machine-readable instructions are executable to cause the processor to:
determine whether the query is sent to the server within a specified time period; and
send a descriptor of a feature of a current image frame to the server in response to a determination that the query is not sent to the server within the specified time period.

* * * * *